US011383929B2

(12) United States Patent
Sato et al.

(10) Patent No.: US 11,383,929 B2
(45) Date of Patent: Jul. 12, 2022

(54) ARTICLE TRANSPORT FACILITY AND ARTICLE TRANSPORT METHOD

(71) Applicant: Daifuku Co., Ltd., Osaka (JP)

(72) Inventors: Nobuhiko Sato, Tokyo (JP); Hirokazu Ooyama, Tokyo (JP); Mamoru Okuhara, Tokyo (JP); Yuya Fukuwa, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 468 days.

(21) Appl. No.: 16/452,606

(22) Filed: Jun. 26, 2019

(65) Prior Publication Data

US 2020/0010274 A1   Jan. 9, 2020

(30) Foreign Application Priority Data

Jul. 3, 2018   (JP) .............................. JP2018-126918

(51) Int. Cl.
G06F 7/00 (2006.01)
B65G 1/137 (2006.01)
B65G 63/00 (2006.01)

(52) U.S. Cl.
CPC ......... B65G 1/1375 (2013.01); B65G 63/002 (2013.01)

(58) Field of Classification Search
CPC .. B65G 1/1375; B65G 63/002; B65G 1/1373; B65G 1/04; G06Q 10/087
USPC ................................. 700/213–216, 218, 228
See application file for complete search history.

(56) References Cited

U.S. PATENT DOCUMENTS

| | | | |
|---|---|---|---|
| 9,111,251 B1 * | 8/2015 | Brazeau | B65G 43/00 |
| 9,195,959 B1 * | 11/2015 | Lopez | G06Q 30/0635 |
| 9,489,655 B1 * | 11/2016 | Lecky | G06K 7/10128 |
| 9,938,081 B2 | 4/2018 | Gondoh et al. | |
| 2008/0071418 A1 * | 3/2008 | Antony | G06Q 10/087 |
| | | | 700/214 |
| 2018/0178979 A1 | 7/2018 | Bretz | |

FOREIGN PATENT DOCUMENTS

| | | |
|---|---|---|
| JP | 200837567 A | 2/2008 |
| JP | 201781754 A | 5/2017 |
| JP | 2017124935 A | 7/2017 |
| JP | 201812586 A | 1/2018 |
| WO | 2014203126 A1 | 12/2014 |

* cited by examiner

Primary Examiner — Yolanda R Cumbess
(74) Attorney, Agent, or Firm — The Webb Law Firm (57) ABSTRACT

A control device executes retrieval control to, in response to a transport request in which a type and an order of each of a plurality of articles that are transported to a transport target location are specified, retrieve all the articles specified in the transport request from a target automatic warehouse, which is one automatic warehouse selected from among a plurality of automatic warehouses, to a retrieval transport device in a specified order that is specified in the transport request. The control device executes, before execution of the retrieval control, inter-warehouse movement control to, if at least one of the plurality of articles specified in the transport request is not stored in the target automatic warehouse, move the article that is not stored in the target automatic warehouse from another automatic warehouse to the target automatic warehouse by using an inter-warehouse transport device.

5 Claims, 3 Drawing Sheets

ARTICLE TRANSPORT FACILITY AND ARTICLE TRANSPORT METHOD

CROSS-REFERENCE TO RELATED APPLICATION

This application claims priority to Japanese Patent Application No. 2018-126918 filed Jul. 3, 2018, the disclosure of which is hereby incorporated by reference in its entirety.

BACKGROUND OF THE INVENTION

1. Field of the Invention

The present invention relates to an article transport facility including a plurality of automatic warehouses that store articles, and a retrieval transport device that transports, to a transport target location, the articles retrieved from the plurality of automatic warehouses, and an article transport method for transporting articles in such an article transport facility.

2. Description of the Related Art

Figure 1:
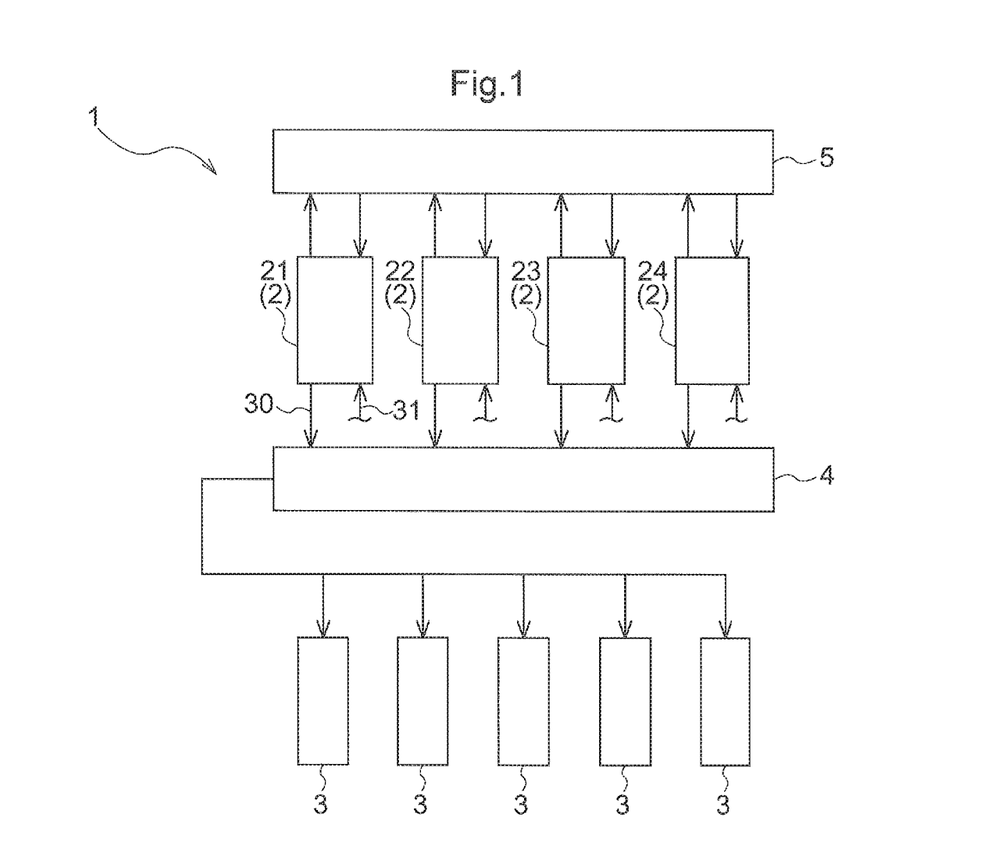
FIG. 1 is a diagram showing a schematic configuration of an article transport facility.

An example of the article transport facility as described above is disclosed in JP 2018-12586A (Patent Document 1). In the following, the reference numerals shown in parentheses in Description of the Related Art are those of Patent Document 1. The article transport facility of Patent Document 1 includes, as shown in FIG. 1 of the document, a storage (1) that includes a plurality of article storage racks, and conveyors (an upstream transport conveyor (C10) and a delivery conveyor (C30)) that transport articles (B) retrieved from the storage (1) to an end portion (Ce) at which a picking operation is performed. Also, with the article transport facility, an article rearrangement device for changing the transport order of the articles (B) is provided at a connection portion between the upstream transport conveyor (C10) and the delivery conveyor (C30), thus enabling the articles (B) to be transported to the end portion (Ce) in an order that is specified (specified order), regardless of the order in which the articles (B) are retrieved from the storage (1). As described in Paragraph 0015 in Patent Document 1, the efficiency of retrieval from the storage (1) can be improved by the ability to retrieve the articles (B) from the storage (1) without consideration given to the specified order.

SUMMARY OF THE INVENTION

Figure 2:
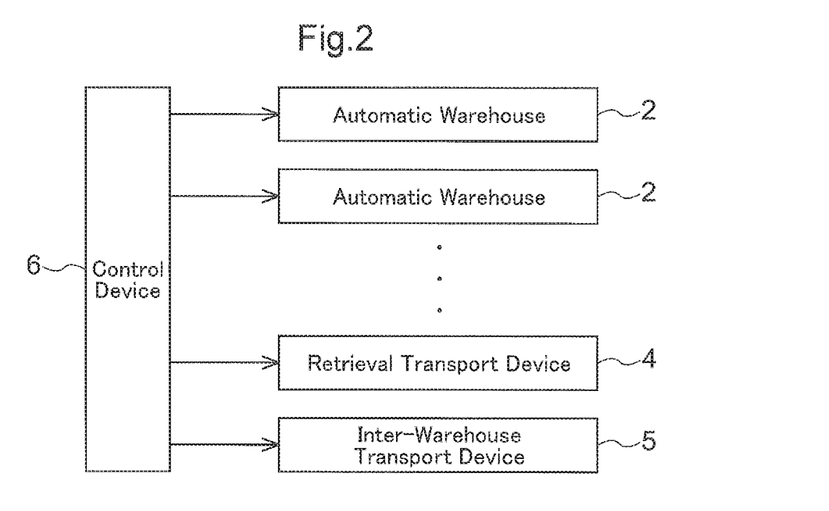
FIG. 2 is a control block diagram.

Meanwhile, the article transport facility of Patent Document 1 is configured, as shown in FIG. 2 in the document, such that any article that is retrieved from the automatic warehouses and transported to the transport target location (i.e., also a group of articles whose order of retrieval from the automatic warehouse matches the specified order) is transported out into the article rearrangement device and is temporarily accumulated in the device before being transported toward the transport target location. Accordingly, although the article transport facility of Patent Document 1 can improve the efficiency of retrieval from the automatic warehouses by providing the article rearrangement device, the cost of the facility and the installation space may increase in order to satisfy the accumulation capability and the transport-in/out capability required for the article rearrangement device.

Therefore, it is desirable to realize a technique by which it is possible to suppress an increase in the installation space and the cost of the facility, while improving the efficiency of retrieval from an automatic warehouse when an article retrieved from the automatic warehouse is transported to a transport target location in a specified order.

An article transport facility according to the present disclosure includes a plurality of automatic warehouses that store articles, a retrieval transport device that transports, to a transport target location, the articles retrieved from the plurality of automatic warehouses, an inter-warehouse transport device that transports the articles between the plurality of automatic warehouses, and a control device that controls the operation of each of the plurality of automatic warehouses, the retrieval transport device, and the inter-warehouse transport device. The control device executes retrieval control to, in response to a transport request in which a type and an order of each of a plurality of articles that are transported to the transport target location are specified, retrieve all the articles specified in the transport request from a target automatic warehouse, which is one automatic warehouse selected from among the plurality of automatic warehouses, to the retrieval transport device in a specified order that is specified in the transport request. The control device executes, before execution of the retrieval control, inter-warehouse movement control to, if at least one of the plurality of articles specified in the transport request is not stored in the target automatic warehouse, move the article that is not stored in the target automatic warehouse from another automatic warehouse to the target automatic warehouse by using the inter-warehouse transport device.

With this configuration, if at least one of a plurality of articles specified in the transport request is not stored in the target automatic warehouse, the inter-warehouse movement control is executed before execution of the retrieval control, and, thereby, all the articles specified in the transport request can be retrieved from the target automatic warehouse to the retrieval transport device in the retrieval control. Accordingly, it is possible to prevent a situation where, even though an article can be retrieved from an automatic warehouse to the retrieval transport device, it is necessary to wait until an earlier article in the specified order is retrieved from another automatic warehouse. This makes it possible to improve the efficiency of retrieval from the automatic warehouses. In the retrieval control, all the articles specified in a transport request are retrieved from the target automatic warehouse to the retrieval transport device in the specified order that is specified in the transport request. Accordingly, it is not necessary to provide an article rearrangement device for changing the transport order of articles retrieved from the automatic warehouses, and the articles can be transported to the transport target location in the specified order that is specified in the transport request. Therefore, it is possible to suppress an increase in the cost of the facility and the installation space as compared with a case where the article rearrangement device is provided.

As described above, with the above-described configuration, it is possible to suppress an increase in the cost of the facility and the installation space, while improving the efficiency of retrieval from automatic warehouses, when articles retrieved from the automatic warehouses are transported to a transport target location in a specified order.

An article transport method according to the present disclosure is an article transport method for transporting articles in an article transport facility, the article transport facility including a plurality of automatic warehouses that store articles, a retrieval transport device that transports, to a transport target location, the articles retrieved from the plurality of automatic warehouses, and an inter-warehouse transport device that transports the articles between the plurality of automatic warehouses. The article transport method includes a retrieval step of, in response to a transport request in which a type and an order of each of a plurality of articles that are transported to the transport target location are specified, retrieving all the articles specified in the transport request from a target automatic warehouse, which is one automatic warehouse selected from among the plurality of automatic warehouses, to the retrieval transport device in a specified order that is specified in the transport request; and, before execution of the retrieval step, an inter-warehouse movement step of, if at least one of the plurality of articles specified in the transport request is not stored in the target automatic warehouse, moving the article that is not stored in the target automatic warehouse from another automatic warehouse to the target automatic warehouse by using the inter-warehouse transport device.

With this configuration, if at least one of a plurality of articles specified in the transport request is not stored in the target automatic warehouse, the inter-warehouse movement step is executed before execution of the retrieval step, and, thereby, all the articles specified in the transport request can be retrieved from the target automatic warehouse to the retrieval transport device in the retrieval step. Accordingly, it is possible to prevent a situation where, even though an article can be retrieved from an automatic warehouse to the retrieval transport device, it is necessary to wait until an earlier article in the specified order is retrieved from another automatic warehouse. This makes it possible to improve the efficiency of retrieval from the automatic warehouses. In the retrieval step, all the articles specified in a transport request are retrieved from the target automatic warehouse to the retrieval transport device in the specified order that is specified in the transport request. Accordingly, it is not necessary to provide an article rearrangement device for changing the transport order of articles retrieved from the automatic warehouses, and the articles can be transported to the transport target location in the specified order that is specified in the transport request. Therefore, it is possible to suppress an increase in the cost of the facility and the installation space as compared with a case where the article rearrangement device is provided.

As described above, with the above-described configuration, it is possible to suppress an increase in the cost of the facility and the installation space, while improving the efficiency of retrieval from automatic warehouses, when articles retrieved from the automatic warehouses are transported to a transport target location in a specified order.

Further features and advantages of the article transport facility and the article transport method will become apparent from the following description of embodiments with reference to the drawings.

DETAILED DESCRIPTION OF PREFERRED EMBODIMENTS

An embodiment of an article transport facility and an article transport method will be described with reference to the drawings. As shown in FIGS. 1 and 2, an article transport facility 1 includes a plurality of automatic warehouses 2, a retrieval transport device 4, an inter-warehouse transport device 5, and a control device 6. Note that the transport direction of articles W is indicated by arrows in FIG. 1 and FIG. 3, which will be referred to below.

Figure 3:
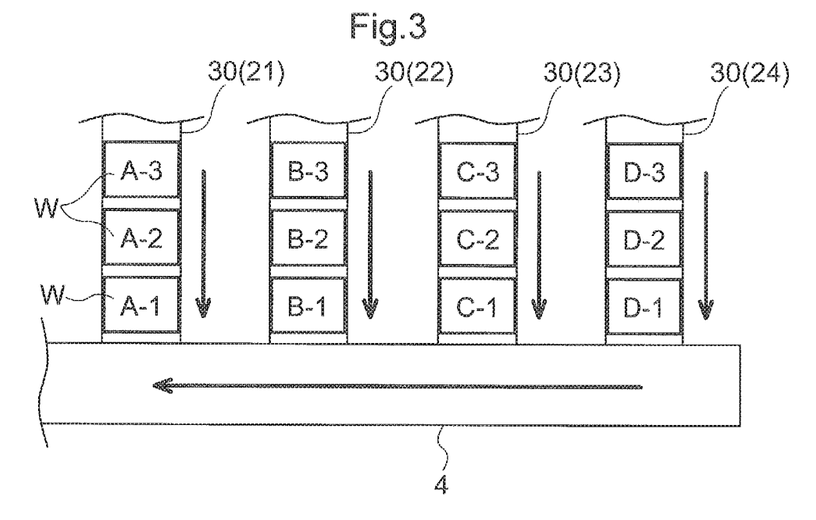
FIG. 3 is a diagram illustrating retrieval control.
Figure 4:
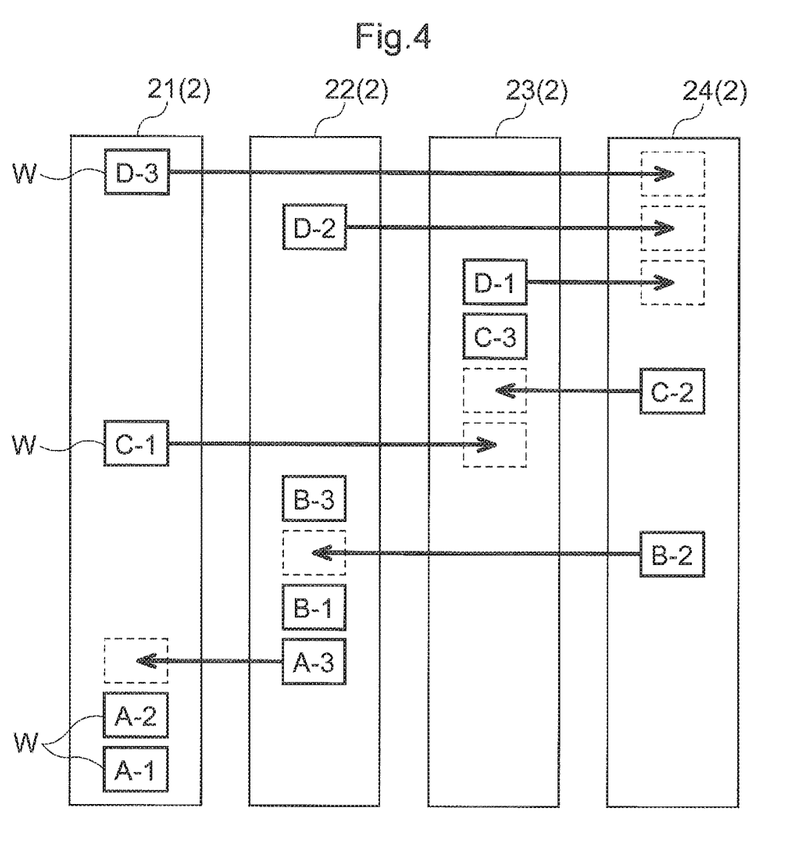
FIG. 4 is a diagram illustrating inter-warehouse movement control.

Each of the plurality of automatic warehouses 2 stores articles W (see FIGS. 3 and 4). Each automatic warehouse 2 is configured to store a plurality of articles W and to automatically transport out an article W that is to be retrieved. Although not shown, the automatic warehouse 2 includes a plurality of levels of storage racks that store the articles W, and a transport device that transports out the articles W stored in the storage racks from the storage racks. The transport device includes, for example, transport carriages provided respectively corresponding to the storage racks, or a stacker crane. Note that each of the automatic warehouses 2 is configured to be capable of transporting out the articles W in that warehouse in any order. In other words, the automatic warehouse 2 is configured to be capable of retrieving articles W in an order different from the order in which a plurality of articles W are stored into that warehouse.

As shown in FIGS. 1 and 3, each automatic warehouse 2 includes a retrieval portion 30, and the above-described transport device included in the automatic warehouse 2 is configured to transport, to the retrieval portion 30, articles W to be retrieved from the storage racks. The retrieval portion 30 is provided with a conveyor (retrieval conveyor) that transports the articles W, and the articles W are transported out (i.e., delivered, or taken out) from the retrieval portion 30 to the retrieval transport device 4 by operating the conveyor. FIG. 3 illustrates, by example, a situation where three articles W are disposed (accumulated) in each retrieval portion 30, and the retrieval portion 30 is configured such that a plurality of articles W can be disposed (accumulated), and the articles W are sequentially transported out to the retrieval transport device 4, starting from the article W located on the downstream side (the side toward the retrieval transport device 4).

As shown in FIG. 1, each automatic warehouse 2 includes a storage portion 31, and the above-described transport device included in the automatic warehouse 2 is configured to transport articles W to be stored, from the storage portion 31 to the storage racks. Articles to replenish the automatic warehouse 2 are transported into the storage portion 31 from the outside of the automatic warehouse 2. Picking processing is a process in which a load housed in a container serving as an article W is removed from the container. When picking processing is performed at a transport target location 3, the article W for which the removal of the load at the transport target location 3 is completed is transported into the storage portion 31 by a storage transport device (not shown).

The retrieval transport device 4 is a device that transports, to the transport target location 3, the articles W retrieved from the plurality of automatic warehouses 2. The retrieval transport device 4 transports the articles W retrieved from the automatic warehouses 2 (here, the articles W transported out from the retrieval portions 30) in one direction (a direction toward the transport target location 3) along a transport path connecting the automatic warehouses 2 and the transport target location 3. If the retrieval transport device 4 transports a plurality of articles W simultaneously, the retrieval transport device 4 transports the plurality of articles W to the downstream side (the side toward the transport target location 3) such that the order of the plurality of articles W arranged in the transport direction is maintained. That is, the retrieval transport device 4 does not have the function of changing the transport order of the articles W (the function of rearranging the articles W). The retrieval transport device 4 is formed, for example, using a conveyor such as a belt conveyor or a roller conveyor.

As shown in FIGS. 1 and 3, the respective retrieval portions 30 of the plurality of automatic warehouses 2 are disposed so as to be arranged in the transport direction of the retrieval transport device 4 at intervals. Here, the article transport facility 1 includes four automatic warehouses 2, namely, a first automatic warehouse 21, a second automatic warehouse 22, a third automatic warehouse 23, and a fourth automatic warehouse 24. The retrieval portion 30 of the fourth automatic warehouse 24, the retrieval portion 30 of the third automatic warehouse 23, the retrieval portion 30 of the second automatic warehouse 22, and the retrieval portion 30 of the first automatic warehouse 21 are disposed in that order from the upstream side in the transport direction of the retrieval transport device 4 (the side opposite to the side toward the transport target location 3).

As shown in FIG. 1, a plurality of transport target locations 3 are provided in the present embodiment. Accordingly, the transport path of the retrieval transport device 4 branches off into a plurality (specifically, the number of transport target locations 3 installed) of branch paths on the downstream side, and each of the branch paths extends to the corresponding transport target location 3. When retrieval control described below is executed, the retrieval transport device 4 is controlled so as to transport articles W retrieved from each of the automatic warehouses 2 to a transport target location 3 that is set as the transport destination of the articles W.

At the transport target location 3, processing (operation) using a robot, an operator, or the like is performed on articles W that are retrieved from the automatic warehouses 2 and are transported by the retrieval transport device 4. That is, the transport target location 3 is a processing station (operating station). Examples of the processing performed at the transport target location 3 include picking processing, packaging processing, assorting processing, and palletizing processing. For example, when picking processing is performed at the transport target location 3, the articles W are containers (cardboard box cases, container cases, etc.) that house a load to be picked, and the required number (the required number corresponding to the shipment destination) of loads are removed from each of the articles W in the picking processing. In this case, one or more (basically, a plurality of) loads of the same type are housed in one article W. For example, when loading processing (assorting processing, palletizing process, etc.) is performed at the transport target location 3, each article W is directly loaded, or the loads removed from the article W are loaded, to a roll box pallet, a cart, a pallet, or the like corresponding to the shipment destination.

All the articles W specified in a transport request are transported to the transport target location 3 by the retrieval transport device 4 in a specified order that is specified in the transport request. Also, at the transport target location 3, the processing on the articles W is performed in order from the earliest arrival at the transport target location 3 (i.e., in the specified order). Since the properties (weight, dimensions, shape, etc.) of an article W (or the load housed in the article W) may differ for each article W, the specified order is set so as to enable the processing on the articles W at the transport target location 3 to be performed appropriately. Thus, the article transport facility 1 is configured to transport the articles W retrieved from the automatic warehouses 2 to the transport target location 3 in the specified order.

The inter-warehouse transport device 5 is a device that transports the articles W between the plurality of automatic warehouses 2. The inter-warehouse transport device 5 is used to collect all the articles W specified in a transport request into one automatic warehouse 2 in inter-warehouse movement control, which will be described below. The inter-warehouse transport device 5 is formed using a conveyor such as a belt conveyor or a roller conveyor, for example.

Although FIG. 1 illustrates, by example, a case where the inter-warehouse transport device 5 is disposed on the side opposite to the side on which the retrieval transport device 4 is disposed relative to the automatic warehouses 2, the placement position of the inter-warehouse transport device 5 is not limited thereto. For example, it is possible to adopt a configuration in which the inter-warehouse transport device 5 is disposed on the same side as the side on which the retrieval transport device 4 is disposed relative to the automatic warehouses 2. In such a case, for example, it is possible to adopt a configuration in which the articles W stored in an automatic warehouse 2 acting as a transport source are transported out from the retrieval portion 30 to the inter-warehouse transport device 5. Alternatively, it is possible to adopt a configuration in which the articles W that have been transported by the inter-warehouse transport device 5 from an automatic warehouse 2 acting as a transport source are transported from the storage portion 31 into the automatic warehouse 2 acting as a transport destination. That is, it is possible to adopt a configuration in which the articles W are transported between the automatic warehouses 2 and the inter-warehouse transport device 5 by using at least a portion of the configuration for transporting the articles W between the automatic warehouse 2 and the retrieval transport device 4.

Although FIG. 1 illustrates, by example, a case where the inter-warehouse transport device 5 is configured to transport the articles W between a plurality of automatic warehouses 2 without the intervention of the retrieval transport device 4, the inter-warehouse transport device 5 can be constructed using a portion of the configuration of the retrieval transport device 4. In this case, the transport path of the inter-warehouse transport device 5 is formed so as to branch off from the retrieval transport device 4 to be connected to the automatic warehouses 2.

Next, a control configuration of the article transport facility 1 according to the present embodiment will be described. As shown in FIG. 2, a control device 6 included in the article transport facility 1 controls the operation of each of the plurality of automatic warehouses 2, the retrieval transport device 4, and the inter-warehouse transport device 5. The control device 6 includes an arithmetic processing device such as a CPU, and also includes a peripheral circuit such as a memory. Various functions of the control device 6 are realized through cooperation between these pieces of hardware and programs executed on hardware such as the arithmetic processing device.

The control device 6 executes retrieval control and inter-warehouse movement control. That is, an article transport method for transporting the articles W in the article transport facility 1 includes a retrieval step and an inter-warehouse movement step. Here, the retrieval control (retrieval step) is a control (step) to, in response to a transport request in which the type and the order of each of a plurality of articles W that are transported to the transport target location 3 are specified, retrieve all the articles W specified in the transport request from a target automatic warehouse. The target automatic warehouse is one automatic warehouse 2 selected from a plurality of automatic warehouses 2. The articles W specified in the transport request are retrieved to the retrieval transport device 4 in the specified order that is specified in the transport request. The inter-warehouse movement control (inter-warehouse movement step) is a control (step) to, if at least one of the plurality of articles W specified in the transport request is not stored in the target automatic warehouse, move the article W that is not stored in the target automatic warehouse from another automatic warehouse 2 to the target automatic warehouse by using the inter-warehouse transport device 5. The control device 6 executes the inter-warehouse movement control (inter-warehouse movement step) before execution of the retrieval control (retrieval step). Note that the control device 6 manages data regarding the position at which each of the articles W is stored, and executes the retrieval control and the inter-warehouse movement control by referring to the data.

The transport request is generated in response to a request from a request source such as a shipment destination of each article W (or the loads housed in the article W). The transport request is generated by the control device 6, or by another device capable of communicating with the control device 6. At this time, the order of the plurality of articles W that are transported to the transport target location 3 is determined with consideration given to the properties of each of the plurality of articles W (or the loads housed in the articles W). A plurality of articles W of the same type may be included in a plurality of articles W that are specified in the transport request. That is, for the transport request, specifying the type of each of the plurality of articles W that are transported to the transport target location 3 means the same as specifying the type of each of the articles W that are transported to the transport target location 3, and the number of articles W for each type. When picking processing in which a load housed in a container serving as an article W is removed from the container is performed at the transport target location 3, the articles W in which loads of the same type are housed are handled as the articles W of the same type regardless of the number of loads housed therein.

For example, when the picking processing is performed at a transport target location 3, a request from a request source specifies the types of loads and the number of loads for each type. A transport request that is generated based on such a request from the request source specifies the types of articles W that house the loads of the specified types, and the number of articles W for each type. The number of articles W for each type is set to the smallest number with which the total number of loads housed is greater than or equal to the specified number of loads of that type. When the articles W are directly loaded at the transport target location 3, a request from the request source specifies the types of articles W and the number of articles W for each type, and a transport request that is generated based on such a request from the request source is the same as the request from the request source.

The retrieval control will be specifically described with reference to FIG. 3. FIG. 3 shows a situation where the first automatic warehouse 21, the second automatic warehouse 22, the third automatic warehouse 23, and the fourth automatic warehouse 24 are selected as target automatic warehouses for transport requests that are different from each other. Specifically, FIG. 3 shows a situation where the first automatic warehouse 21 is selected as the target automatic warehouse for a transport request to transport three articles W, namely, an article (A-1), an article (A-2), and an article (A-3) to the transport target location 3 in the order of the article (A-1), the article (A-2), and the article (A-3), the second automatic warehouse 22 is selected as the target automatic warehouse for a transport request to transport three articles W, namely, an article (B-1), an article (B-2), and an article (B-3), to the transport target location 3 in the order of the article (B-1), the article (B-2), and the article (B-3), the third automatic warehouse 23 is selected as the target automatic warehouse for a transport request to transporting three articles W, namely, an article (C-1), an article (C-2), and an article (C-3) to the transport target location 3 in the order of the article (C-1), the article (C-2), and the article (C-3), and the fourth automatic warehouse 24 is selected as the target automatic warehouse for a transport request to transport three articles W, namely, an article (D-1), an article (D-2), and an article (D-3) to the transport target location 3 in the order of the article (D-1), the article (D-2), and the article (D-3).

Also, FIG. 3 shows a situation where, as a result of execution of inter-warehouse movement control (details thereof will be described below) shown in FIG. 4, all the articles W (here, three articles W) specified in the transport request have been collected in each of the first automatic warehouse 21, the second automatic warehouse 22, the third automatic warehouse 23, and the fourth automatic warehouse 24. Here, a situation is shown in which all the articles W specified in the transport request are disposed in the retrieval portion 30 of each of the target automatic warehouses. The articles W are arranged from the downstream side in the order specified in the transport request. By executing the retrieval control for the first automatic warehouse 21 in such a situation, the three articles W, namely, the article (A-1), the article (A-2), and the article (A-3), can be retrieved to the retrieval transport device 4 in the order of the article (A-1), the article (A-2), and the article (A-3). That is, all the articles W specified in the transport request can be retrieved from the target automatic warehouse (here, the first automatic warehouse 21) to the retrieval transport device 4 in the specified order that is specified in the transport request. By also executing the retrieval control in the same manner for the second automatic warehouse 22, the third automatic warehouse 23, and the fourth automatic warehouse 24, all the articles W specified in the transport request can be retrieved from the target automatic warehouse to the retrieval transport device 4 in the specified order that is specified in the transport request.

Note that the retrieval control is executed, provided that the target automatic warehouse has entered a state (hereinafter referred to as "retrievable state") in which all the articles W specified in the transport request can be retrieved. The retrievable state can be, for example, a state in which all the articles W specified in the transport request are present in the target automatic warehouse, a state in which all the articles W specified in the transport request are present in the target automatic warehouse, and the first article W in the specified order has arrived at the retrieval portion 30, or a state in which all the articles W specified in the transport request have arrived at the retrieval portion 30 of the target automatic warehouse. Even in a state in which one of the plurality of articles W specified in the transport request is not present in the target automatic warehouse can be regarded as the retrievable state. For example, if a state is expected to be brought about in which all the articles W specified in the transport request are present at the target automatic warehouse (e.g., an article W that is not present in the target automatic warehouse is being transported toward the target automatic warehouse by the inter-warehouse transport device 5), that state can be regarded as the retrievable state. In this case, the retrieval control may be started before the inter-warehouse movement control ends. However, even in this case, the inter-warehouse movement control is executed before execution of the retrieval control (i.e., the inter-warehouse movement control is started before the retrieval control is started).

Although the retrieval control is executed in order from the target automatic warehouse that has entered the retrievable state earlier, a plurality of target automatic warehouses may enter the retrievable state at the same time as in the case shown in FIG. 3. In such a case, it is possible to adopt, for example, a configuration in which the retrieval control is executed in order from the earliest time of occurrence of the transport request. When a priority level is set for each transport request, it is possible to adopt a configuration in which the retrieval control is executed in order from the highest priority of the transport request. A plurality of retrieval controls corresponding to a plurality of transport requests can be executed at the same time. In this case, in a state in which articles W are transported by the retrieval transport device 4, an article W specified in another transport request may be disposed between two articles W specified in the original transport request. However, by retrieving the articles W from each of the target automatic warehouses in the specified order that is specified in the transport request, and differentiating, among the plurality of target automatic warehouses, transport target locations 3, each serving as transport destination of a group of articles W (all the articles W specified in one transport request) retrieved from each of the target automatic warehouses, the articles W retrieved from each of the target automatic warehouses can be transported to the corresponding transport target location 3 in the specified order.

In the present embodiment, the control device 6 is configured to determine the transport target location 3 that serves as the transport destination of a group of articles W retrieved from the target automatic warehouse by the retrieval control, according to the state of progress of processing on the articles W at each of the transport target locations 3 at the point in time when the first article W in the specified order is retrieved from the automatic warehouse 2 to the retrieval transport device 4 (here, at the point in time when the aforementioned article W is transported out from the retrieval portion 30 to the retrieval transport device 4). As an example, the control device 6 is configured to determine the transport target location 3 in the following manner. The control device determines if there is any transport target location 3 for which the previous processing (a series of processing corresponding to one transport request) has already ended at the point in time when the first article W in the specified order is retrieved from the automatic warehouse 2 to the retrieval transport device 4. If so, the control device 6 selects that transport target location 3 as the transport destination of a group of articles W retrieved from the target automatic warehouse by the retrieval control. If there is no transport target location 3 for which the previous processing has already ended at the point in time when the first article W in the specified order is retrieved from the automatic warehouse 2 to the retrieval transport device 4, the control device 6 selects the transport target location 3 for which the state of progress of processing (a series of processing corresponding to one transport request) is most advanced (i.e., the transport target location 3 for which processing is expected to end earliest) from among the plurality of transport target locations 3, as the transport destination of a group of articles W retrieved from the target automatic warehouse by the retrieval control. If there are a plurality of transport target locations 3 that satisfy the same condition, the selection among the transport target locations 3 may be performed based on a condition other than the state of progress of processing. For example, the selection may be performed based on the transport distance from the target automatic warehouse to each of the transport target locations 3, or the processing capability or the like at each of the transport target locations 3.

Next, the inter-warehouse movement control will be described with reference to FIG. 4. FIG. 4 assumes the same situation as that shown in FIG. 3. In FIG. 4, each article W is indicated by a solid line in a frame indicating the automatic warehouse 2 in which the article W is stored before execution of the inter-warehouse movement control. For articles W that are moved by the inter-warehouse movement control, each article W after execution of the inter-warehouse movement control is indicated by a broken line in a frame indicating the automatic warehouse 2 to which the article W is moved. By executing the inter-warehouse movement control as shown in FIG. 4, all the articles W specified in the transport request are collected into the corresponding target automatic warehouse as shown in FIG. 3.

The control device 6 is configured to determine the target automatic warehouse such that the number of times that the articles W are moved between different automatic warehouses 2 by the inter-warehouse movement control (hereinafter simply referred to as "number of times of movement") is smallest. If there is any automatic warehouse 2 in which all the articles W specified in the transport request are stored (i.e., if there is any automatic warehouse 2 for which the number of times of movement is zero), that automatic warehouse 2 is determined as the target automatic warehouse. When the control device 6 selects one automatic warehouse 2 as the target automatic warehouse in response to a transport request, the control device 6 manages the automatic warehouse 2 as an automatic warehouse 2 that is being selected as the target automatic warehouse, at least until the retrieval control in response to the transport request is started (e.g., until the retrieval control ends). Then, at a point in time after the retrieval control in response to the transport request has been started (e.g., at the point in time when the retrieval control ends), the control device 6 manages the automatic warehouse 2 as an automatic warehouse 2 that is not being selected as the target automatic warehouse. When the control device 6 has selected the automatic warehouse 2 being selected as the target automatic warehouse as the target automatic warehouse in response to another transport request, the control device 6 manages the other transport request as an unprocessed transport request, and executes the retrieval control in response to the transport request in order from the earliest time of selection of the target automatic warehouse. Then, at a point in time after the retrieval control in response to the last transport request has been started (e.g., at the point in time when the retrieval control ends), the control device 6 manages the automatic warehouse 2 as an automatic warehouse 2 that is not being selected as the target automatic warehouse.

The selection of the target automatic warehouse will be specifically described with reference to FIG. 4. For example, for a transport request to transport three articles W, namely, the article (A-1), the article (A-2), and the article (A-3), to the transport target location 3 in the order of the article (A-1), the article (A-2), and the article (A-3), the number of times of movement is once when the first automatic warehouse 21 is selected as the target automatic warehouse, the number of times of movement is twice when the second automatic warehouse 22 is selected as the target automatic warehouse, and the number of times of movement is three times when the third automatic warehouse 23 or the fourth automatic warehouse 24 is selected as the target automatic warehouse. Accordingly, the first automatic warehouse 21 is selected as the target automatic warehouse, and the inter-warehouse movement control is executed so as to move the article (A-3) to the first automatic warehouse 21. Similarly, for a transport request to transport three articles W, namely, the article (B-1), the article (B-2), and the article (B-3), to the transport target location 3 in the order of the article (B-1), the article (B-2), and the article (B-3), the second automatic warehouse 22 is selected as the target automatic warehouse, and the inter-warehouse movement control is executed so as to move the article (B-2) to the second automatic warehouse 22.

On the other hand, in the situation assumed here, for a transport request to transport three articles W, namely, the article (C-1), the article (C-2), and the article (C-3), to the transport target location 3 in the order of the article (C-1), the article (C-2), and the article (C-3), the number of times of movement is smallest, namely, twice, when one of the first automatic warehouse 21, the third automatic warehouse 23, and the fourth automatic warehouse 24 is selected as the target automatic warehouse; however, among the three automatic warehouses 2, the first automatic warehouse 21 is being selected as the target automatic warehouse for another transport request, and the third automatic warehouse 23 and the fourth automatic warehouse 24 are not being selected as the target automatic warehouse for another transport request. As in this case, when a plurality of automatic warehouses 2 for which the number of times of movement is smallest include any automatic warehouse 2 that is not being selected as the target automatic warehouse for another transport request, the efficiency of processing transport requests can be improved by selecting that automatic warehouse 2 as the target automatic warehouse. From such a viewpoint, in the situation shown in FIG. 4, the third automatic warehouse 23 or the fourth automatic warehouse 24 (here, the third automatic warehouse 23) is selected as the target automatic warehouse, and the inter-warehouse movement control is executed so as to move the article (C-1) and the article (C-2) to the third automatic warehouse 23. If all of a plurality of automatic warehouses 2 for which the number of times of movement is smallest are being selected as the target automatic warehouses for another transport request, the automatic warehouse 2 for which the number of unprocessed transport requests is smallest may be selected as the target automatic warehouse, from among the plurality of automatic warehouses 2, for example.

For a transport request to transport three articles W, namely, the article (D-1), the article (D-2), and the article (D-3), to the transport target location 3 in the order of the article (D-1), the article (D-2), and the article (D-3), the number of times of movement is smallest, namely, twice, when one of the first automatic warehouse 21, the second automatic warehouse 22, and the third automatic warehouse 23 is selected as the target automatic warehouse, whereas the number of times of movement is more than twice, namely, three times, when the fourth automatic warehouse 24 is selected as the target automatic warehouse. Accordingly, to make the number of times of movement smallest, one of the first automatic warehouse 21, the second automatic warehouse 22, and the third automatic warehouse 23 may be selected as the target automatic warehouse. However, in the situation assumed here, the first automatic warehouse 21, the second automatic warehouse 22, and the third automatic warehouse 23 are being selected as the target automatic warehouse for another transport request, and the fourth automatic warehouse 24 is not being selected as the target automatic warehouse for another transport request. As in this case, if all of the automatic warehouses 2 for which the number of times of movement is smallest are being selected as the target automatic warehouse for another transport request, and if there is any automatic warehouse 2 for which the number of times of movement is not smallest, but that is not being selected as the target automatic warehouse for another transport request, the efficiency of processing transport requests can be improved by selecting that automatic warehouse 2 as the target automatic warehouse. From such a viewpoint, in the situation shown in FIG. 4, the fourth automatic warehouse 24 is selected as the target automatic warehouse, and the inter-warehouse movement control is executed so as to move the article (D-1), the article (D-2), and the article (D-3) to the fourth automatic warehouse 24.

As described above, if there is any automatic warehouse 2 that is not being selected as the target automatic warehouse for another transport request, the efficiency of processing transport requests can be improved by selecting that automatic warehouse 2 as the target automatic warehouse. In view of this, in the present embodiment, the control device 6 is configured to, if there is any automatic warehouse 2 that is not being selected as the target automatic warehouse for another transport request, preferentially select that automatic warehouse 2 as the target automatic warehouse. Specifically, the control device 6 is configured to, if there are a plurality of automatic warehouses 2 for which the number of times of movement is smallest, and if the plurality of automatic warehouses 2 include any automatic warehouse 2 (unselected automatic warehouse) that is not being selected as the target automatic warehouse for another transport request, select that automatic warehouse 2 (that unselected automatic warehouse) as the target automatic warehouse. Also, the control device 6 is configured to, if all of one or more automatic warehouses 2 for which the number of times of movement is smallest are being selected as the target automatic warehouse for another transport request, and if there is any automatic warehouse 2 (unselected automatic warehouse) for which the number of times of movement is not smallest, but that is not being selected as the target automatic warehouse for another transport request, select that automatic warehouse 2 (that unselected automatic warehouse) as the target automatic warehouse. In this case, if there are a plurality of automatic warehouses 2 that are not being selected as the target automatic warehouse for another transport request, the automatic warehouse 2 for which the number of times of movement is smallest may be selected, from among these plurality of automatic warehouses 2, as the target automatic warehouse. Furthermore, the condition for selecting the target automatic warehouse may include the condition that the number of times of movement is less than or equal to a predetermined set number of times. If the number of times of movement exceeds the set number of times when an automatic warehouse 2 that is not being selected as the target automatic warehouse for another transport request is selected as the target automatic warehouse, an automatic warehouse 2 that is being selected as the target automatic warehouse for another transport request, and for which the number of times of movement is smallest may be selected as the target automatic warehouse.

As described above, basically, the control device 6 is configured to determine the target automatic warehouse such that the number of times of movement is smallest. However, it is possible to actively implement a configuration in which each of the plurality of automatic warehouses 2 is selected as the target automatic warehouse to the same extent. For example, it is possible to adopt a configuration in which the control device 6 selects an automatic warehouse 2 for which the number of unprocessed transport requests is smallest as the target automatic warehouse, or a configuration in which the control device 6 selects an automatic warehouse 2 for which the number of times that the automatic warehouse 2 is selected as the target automatic warehouse within a predetermined period is smallest as the target automatic warehouse. In the case of adopting such configurations, if there are a plurality of automatic warehouses 2 for which the number of unprocessed transport requests or the number of times that the automatic warehouses 2 are selected as the target automatic warehouse is smallest, an automatic warehouse 2 for which the number of times of movement is smallest may be selected, from among those plurality of automatic warehouses 2, as the target automatic warehouse. In the case of adopting such a configuration as well, the condition for selecting the target automatic warehouse may include the condition that the number of times of movement is less than or equal to a predetermined set number of times.

To efficiently execute the inter-warehouse movement control, a free space (free rack) for storing articles W that have been moved from another automatic warehouse 2 needs to be secured for each of the plurality of automatic warehouses 2. For this reason, the article transport facility 1 may require an increased number of automatic warehouses 2 as compared with a configuration in which the inter-warehouse movement control is not executed. However, in the inter-warehouse movement control, among a plurality of articles W specified in the transport request, articles W that are stored in the target automatic warehouse do not need to be moved using the inter-warehouse transport device 5. Accordingly, even if the number of automatic warehouses 2 installed is increased, the number of increase can be minimized due to the presence of the articles W that do not need to be moved. Furthermore, in the inter-warehouse movement control, the articles W are stored in the automatic warehouses 2 both before and after they are moved. Accordingly, unlike the article rearrangement device of Patent Document 1 described above, the inter-warehouse transport device 5 does not need to have the function of accumulating a plurality of articles W, and an increase in the cost of the facility and the installation space can be more easily suppressed than in a case where the article rearrangement device is provided.

Figure 5:
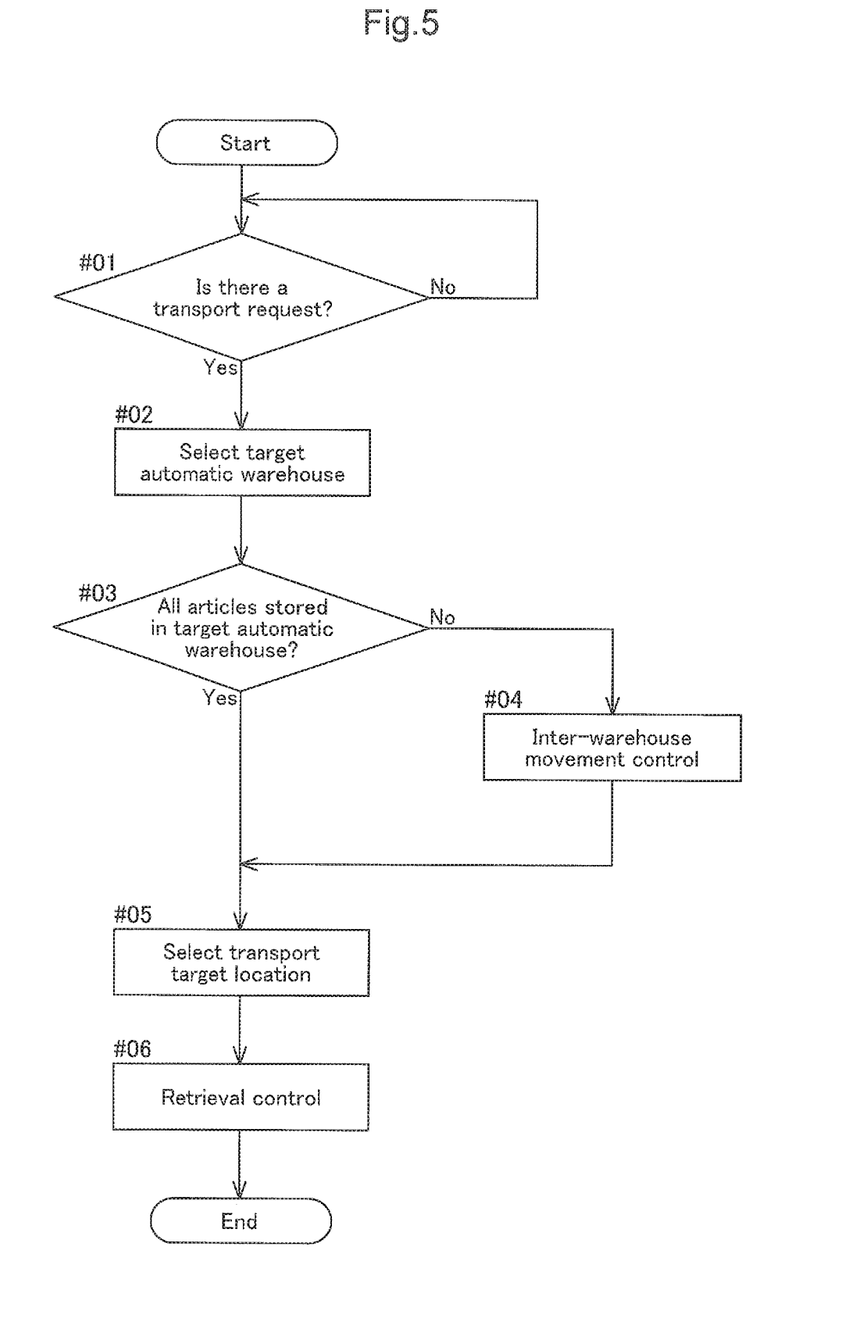
FIG. 5 is a control flow diagram.

Next, a processing flow when the control device 6 executes the retrieval control and the inter-warehouse movement control will be described with reference to the flowchart shown in FIG. 5. Each time a transport request occurs (step #01: Yes), the control device 6 executes the processing of step #02 onward.

If there is any transport request (step #01: Yes), the control device 6 selects the target automatic warehouse from among a plurality of automatic warehouses 2 (step #02). Then, if all the articles W that are specified in the transport request are stored in the target automatic warehouse (step #03: Yes), the control device 6 selects the transport target location 3 (step #05), and executes the retrieval control (retrieval step) (step #06). On the other hand, if at least one of a plurality of articles W that are specified in the transport request is not stored in the target automatic warehouse (step #03: No), the control device 6 executes the inter-warehouse movement control (inter-warehouse movement step) (step #04), then selects the transport target location 3 (step #05), and executes the retrieval control (retrieval step) (step #06).

Other Embodiments

Next, other embodiments of the article transport facility and the article transport method will be described.

(1) The above embodiment has described, as an example, a configuration in which the control device 6 is configured to determine the transport target location 3 that serves as the transport destination of a group of articles W retrieved from the target automatic warehouse by the retrieval control, according to the state of progress of processing on the articles W at each of the transport target locations 3 at the point in time when the first article W in the specified order is retrieved from the automatic warehouse 2 to the retrieval transport device 4. However, the present disclosure is not limited to such a configuration, and it is possible to adopt, for example, a configuration in which the control device 6 is configured to determine the transport target location 3 that serves as the transport destination of a group of articles W retrieved from the target automatic warehouse by the retrieval control, according to the state of progress of processing on the articles W at each of the transport target locations 3 at a point in time before the point in time when the first article W in the specified order is retrieved from the automatic warehouse 2 to the retrieval transport device 4. The "point in time before" is, for example, the point in time when the first article W in the specified order has arrived at the retrieval portion 30 of the target automatic warehouse, or the point in time when the first article W in the specified order has been transported out from a storage rack in the target automatic warehouse.

(2) The above embodiment has described, as an example, a configuration in which the transport target location 3 that serves as the transport destination of a group of articles W retrieved from the target automatic warehouse by the retrieval control is not limited to a specific transport target location 3. However, the present disclosure is not limited to such a configuration, and it is possible to adopt, a for example, a configuration in which automatic warehouses 2 are respectively associated with transport target locations 3 in advance, and the transport target location 3 that serves as the transport destination of a group of articles W retrieved from a target automatic warehouse by the retrieval control is set to the transport target location 3 associated with the target automatic warehouse. When a plurality of transport target locations 3 are associated with one automatic warehouse 2, one transport target location 3 may be determined based on the state of progress of processing on the articles W at each of the plurality of transport target locations 3, as in the case of the above embodiment.

(3) The above embodiment has described, as an example, a configuration in which a plurality of transport target locations 3 are provided. However, the present disclosure is not limited to such a configuration, and it is possible to adopt, for example, a configuration in which only one transport target location 3 is provided.

(4) Note that the configurations disclosed in the embodiments described above are applicable in combination with configurations disclosed in other embodiments (including combinations of the embodiments described as Other Embodiments) as long as no inconsistency arises. With regard to the other configurations as well, the embodiments disclosed herein are illustrative in all respects. Therefore, various modifications and alterations may be made as appropriate without departing from the gist of the present disclosure.

Outline of the Embodiment

The following describes an outline of the article transport facility and the article transport method described above.

An article transport facility includes a plurality of automatic warehouses that store articles, a retrieval transport device that transports, to a transport target location, the articles retrieved from the plurality of automatic warehouses, an inter-warehouse transport device that transports the articles between the plurality of automatic warehouses, and a control device that controls the operation of each of the plurality of automatic warehouses, the retrieval transport device, and the inter-warehouse transport device. The control device executes retrieval control to, in response to a transport request in which a type and an order of each of a plurality of articles that are transported to the transport target location are specified, retrieve all the articles specified in the transport request from a target automatic warehouse, which is one automatic warehouse selected from among the plurality of automatic warehouses, to the retrieval transport device in a specified order that is specified in the transport request. The control device executes, before execution of the retrieval control, inter-warehouse movement control to, if at least one of the plurality of articles specified in the transport request is not stored in the target automatic warehouse, move the article that is not stored in the target automatic warehouse from another automatic warehouse to the target automatic warehouse by using the inter-warehouse transport device.

With this configuration, if at least one of a plurality of articles specified in the transport request is not stored in the target automatic warehouse, the inter-warehouse movement control is executed before execution of the retrieval control, and, thereby, all the articles specified in the transport request can be retrieved from the target automatic warehouse to the retrieval transport device in the retrieval control. Accordingly, it is possible to prevent a situation where, even though an article can be retrieved from an automatic warehouse to the retrieval transport device, it is necessary to wait until an earlier article in the specified order is retrieved from another automatic warehouse. This makes it possible to improve the efficiency of retrieval from the automatic warehouses. In the retrieval control, all the articles specified in a transport request are retrieved from the target automatic warehouse to the retrieval transport device in the specified order that is specified in the transport request. Accordingly, it is not necessary to provide an article rearrangement device for changing the transport order of articles retrieved from the automatic warehouses, and the articles can be transported to the transport target location in the specified order that is specified in the transport request. Therefore, it is possible to suppress an increase in the cost of the facility and the installation space as compared with a case where the article rearrangement device is provided.

As described above, with the above-described configuration, it is possible to suppress an increase in the cost of the facility and the installation space, while improving the efficiency of retrieval from automatic warehouses, when articles retrieved from the automatic warehouses are transported to a transport target location in a specified order.

Here, it is preferable that a plurality of the transport target locations are provided, and the control device determines the transport target location that serves as a transport destination of a group of articles retrieved from the target automatic warehouse by the retrieval control, according to a state of progress of processing on the articles at each of the transport target locations at a point in time when the first article in the specified order is retrieved from the automatic warehouse to the retrieval transport device.

With this configuration, the transport target location that serves as the transport destination can be determined at the timing at which the retrieval control is started, despite the fact that the time required for a target automatic warehouse to enter a state (hereinafter referred to as "retrievable state") in which all the articles specified in the transport request can be retrieved may vary depending on the storage position of each of the articles in the target automatic warehouse or the operating state of the target automatic warehouse. Since the transport target location that serves as the transport destination is determined according to the state of progress of processing on the articles at each of the transport target locations, a transport target location for which the processing can be expected to be executed early, for example, a transport target location for which the previous processing has already ended, can be determined as the transport destination. Accordingly, with the above-described configuration, it is possible to efficiently execute the processing at each of the transport target locations, while minimizing the influence exerted by the fact that the time required for the target automatic warehouse to enter the retrievable state varies as described above.

It is preferable that the control device determines the target automatic warehouse such that the number of times that the article is moved between different automatic warehouses by the inter-warehouse movement control is smallest.

With this configuration, the time required for the target automatic warehouse to enter the retrievable state from occurrence of a transport request can be kept short, and the retrieval control in response to the transport request can be executed earlier. Furthermore, the amount of articles transported by the inter-warehouse transport device can be kept small, and it is therefore possible to easily simplify the configuration of the inter-warehouse transport device and to reduce the size thereof.

It is preferable that, if there is any automatic warehouse that is not being selected as the target automatic warehouse for another transport request, the control device preferentially selects the automatic warehouse as the target automatic warehouse.

With this configuration, if there is any automatic warehouse that is not being selected as the target automatic warehouse for another transport request, that automatic warehouse is preferentially selected as the target automatic warehouse for a new transport request, and, thereby, the retrieval control in response to the new transport request can be executed earlier. Accordingly, it is possible to improve the efficiency of processing transport requests by effectively using the automatic warehouses.

An article transport method for transporting articles in an article transport facility, the article transport facility including a plurality of automatic warehouses that store articles, a retrieval transport device that transports, to a transport target location, the articles retrieved from the plurality of automatic warehouses, and an inter-warehouse transport device that transports the articles between the plurality of automatic warehouses. The article transport method includes a retrieval step of, in response to a transport request in which a type and an order of each of a plurality of articles that are transported to the transport target location are specified, retrieving all the articles specified in the transport request from a target automatic warehouse, which is one automatic warehouse selected from among the plurality of automatic warehouses, to the retrieval transport device in a specified order that is specified in the transport request; and, before execution of the retrieval step, an inter-warehouse movement step of, if at least one of the plurality of articles specified in the transport request is not stored in the target automatic warehouse, moving the article that is not stored in the target automatic warehouse from another automatic warehouse to the target automatic warehouse by using the inter-warehouse transport device.

With this configuration, if at least one of a plurality of articles specified in the transport request is not stored in the target automatic warehouse, the inter-warehouse movement step is executed before execution of the retrieval step, and, thereby, all the articles specified in the transport request can be retrieved from the target automatic warehouse to the retrieval transport device in the retrieval step. Accordingly, it is possible to prevent a situation where, even though an article can be retrieved from an automatic warehouse to the retrieval transport device, it is necessary to wait until an earlier article in the specified order is retrieved from another automatic warehouse. This makes it possible to improve the efficiency of retrieval from the automatic warehouses. In the retrieval step, all the articles specified in a transport request are retrieved from the target automatic warehouse to the retrieval transport device in the specified order that is specified in the transport request. Accordingly, it is not necessary to provide an article rearrangement device for changing the transport order of articles retrieved from the automatic warehouses, and the articles can be transported to the transport target location in the specified order that is specified in the transport request. Therefore, it is possible to suppress an increase in the cost of the facility and the installation space as compared with a case where the article rearrangement device is provided.

As described above, with the above-described configuration, it is possible to suppress an increase in the cost of the facility and the installation space, while improving the efficiency of retrieval from automatic warehouses, when articles retrieved from the automatic warehouses are transported to a transport target location in a specified order.

It is sufficient that the article transport facility according to the present disclosure can achieve at least one of the above-described effects. Various additional features illustrated as preferred embodiments of the article transport facility can be incorporated into the article transport method according to the present disclosure, in which case, the article transport method can achieve the operations and effects corresponding to the respective additional features.

What is claimed is:

1. An article transport facility comprising:
    a plurality of automatic warehouses that store articles, wherein articles are retrieved from the plurality of automatic warehouses;
    an inter-warehouse transport device that transports the articles between the plurality of automatic warehouses;
    a retrieval transport device that transports, to a transport target location, the articles retrieved from the plurality of automatic warehouses; and
    a control device that controls operation of each of the plurality of automatic warehouses, the retrieval transport device, and the inter-warehouse transport device,
    wherein the control device is configured to, in response to a transport request including a type and an order of each of a plurality of articles to be transported to the transport target location;
    select a target automatic warehouse from among the plurality of automatic warehouses;
    execute an inter-warehouse movement control that, if at least one of the plurality of articles specified in the transport request is not stored in the target automatic warehouse, causes the inter-warehouse transport device to move the article that is not stored in the target automatic warehouse to the target automatic warehouse from another automatic warehouse; and
    execute a retrieval control to retrieve all the articles specified in the transport request from the target automatic warehouse to the retrieval transport device in the order that is specified in the transport request.

2. The article transport facility according to claim 1, wherein the transport target location comprises a plurality of the transport target locations, and
    wherein the control device determines one transport target location from the plurality of transport target locations to serve as a transport destination of a group of articles retrieved from the target automatic warehouse by the retrieval control,
    wherein the one transport target location is determined according to a progress of processing on the articles at each of the transport target locations at a point in time when a first article in the specified order is retrieved from the target automatic warehouse to the retrieval transport device.

3. The article transport facility according to claim 1, wherein the control device determines the target automatic warehouse to minimize the number of times that the article that is not stored in the target automatic warehouse is moved between different automatic warehouses by the inter-warehouse movement control.

4. The article transport facility according to claim 1, wherein, if there is an unselected automatic warehouse that is not selected as another target automatic warehouse for another transport request, the control device selects the unselected automatic warehouse as the target automatic warehouse.

5. An article transport method for transporting articles in an article transport facility, the article transport facility comprising a plurality of automatic warehouses that store articles, a retrieval transport device that transports, to a transport target location, the articles retrieved from the plurality of automatic warehouses, and an inter-warehouse transport device that transports the articles between the plurality of automatic warehouses,
    the article transport method comprising, in response to a transport request including a type and an order of each of a plurality of articles to be transported to the transport target location;
    selecting a target automatic warehouse from among the plurality of automatic warehouses;
    executing an inter-warehouse movement control that, if at least one of the plurality of articles specified in the transport request is not stored in the target automatic warehouse, causes the inter-warehouse transport device to move the article that is not stored in the target automatic warehouse to the target automatic warehouse from another automatic warehouse; and
    executing a retrieval step of retrieving all the articles specified in the transport request from the target automatic warehouse to the retrieval transport device in the order that is specified in the transport request.

* * * * *

UNITED STATES PATENT AND TRADEMARK OFFICE
CERTIFICATE OF CORRECTION

PATENT NO. : 11,383,929 B2
APPLICATION NO. : 16/452606
DATED : July 12, 2022
INVENTOR(S) : Nobuhiko Sato et al.

It is certified that error appears in the above-identified patent and that said Letters Patent is hereby corrected as shown below:

In the Claims

Column 17, Line 61, Claim 1, delete "location;" and insert -- location: --

Column 18, Line 49, Claim 5, delete "location;" and insert -- location: --

Signed and Sealed this
First Day of November, 2022

*Katherine Kelly Vidal*

Katherine Kelly Vidal
*Director of the United States Patent and Trademark Office*